(12) United States Patent  
Condoluci et al.

(10) Patent No.: US 12,156,084 B2  
(45) Date of Patent: Nov. 26, 2024

(54) NOTIFICATION OF EXPECTED EVENT

(71) Applicant: Telefonaktiebolaget LM Ericsson (publ), Stockholm (SE)

(72) Inventors: Massimo Condoluci, Solna (SE); Stefano Sorrentino, Solna (SE); Henrik Rydén, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 17/629,888

(22) PCT Filed: Jan. 31, 2020

(86) PCT No.: PCT/EP2020/052433  
§ 371 (c)(1),  
(2) Date: Jan. 25, 2022

(87) PCT Pub. No.: WO2021/018418  
PCT Pub. Date: Feb. 4, 2021

(65) Prior Publication Data  
US 2022/0256422 A1 Aug. 11, 2022

Related U.S. Application Data

(60) Provisional application No. 62/879,491, filed on Jul. 28, 2019.

(51) Int. Cl.  
*H04W 36/00* (2009.01)  
*H04L 41/0816* (2022.01)  
*H04L 41/147* (2022.01)

(52) U.S. Cl.  
CPC . *H04W 36/008375* (2023.05); *H04L 41/0816* (2013.01); *H04L 41/147* (2013.01)

(58) Field of Classification Search  
None  
See application file for complete search history.

(56) References Cited

U.S. PATENT DOCUMENTS 6,125,278 A * 9/2000 Wieczorek ............ H04W 28/26  
455/437  
2015/0319668 A1* 11/2015 Guo ...................... H04W 72/51  
370/331

(Continued)

FOREIGN PATENT DOCUMENTS

EP 3648503 B1 * 2/2022 ........... H04L 47/193  
JP 2014515222 A 6/2014

(Continued)

OTHER PUBLICATIONS

3GPP, "3rd Generation Partnership Project; Technical Specification Group Services and System Aspects; Study of Enablers for Network Automation for 5G (Release 16)", 3GPP TR 23.791 V16.2.0, Jun. 2019, 1-124.

(Continued)

*Primary Examiner* — Kenny S Lin  
(74) *Attorney, Agent, or Firm* — Murphy, Bilak & Homiller, PLLC

(57) ABSTRACT

In one aspect, network nodes maybe configured for improving predictability of application performance in a wireless communication system. A mobile network domain predicts an upcoming network event affecting a UE operating in the wireless communication system and notifies an application server (AS) providing an application service to the UE of the predicted network event. The AS may be notified through an Application Function (AF). The AS receives the notification and adjusts operation of the application service and/or a configuration of the UE, in response to the notification.

19 Claims, 14 Drawing Sheets

(56) References Cited

U.S. PATENT DOCUMENTS

| | | | |
|---|---|---|---|
| 2016/0157114 A1 | 6/2016 | Kalderen et al. | |
| 2017/0325140 A1* | 11/2017 | Da Silva | H04W 36/0088 |
| 2018/0295548 A1* | 10/2018 | Kumar | H04W 36/0083 |
| 2019/0118832 A1* | 4/2019 | Mimura | G05D 1/0278 |
| 2020/0076520 A1* | 3/2020 | Jana | H04B 17/327 |
| 2020/0196203 A1* | 6/2020 | Yang | H04W 36/0033 |

FOREIGN PATENT DOCUMENTS

| | | | |
|---|---|---|---|
| JP | 2014534742 A | 12/2014 | |
| JP | 2019075073 A | 5/2019 | |
| WO | WO-0007384 A1 * | 2/2000 | H04W 28/26 |
| WO | 2012139016 A2 | 10/2012 | |
| WO | 2013063609 A1 | 5/2013 | |
| WO | 2019081026 A1 | 5/2019 | |

OTHER PUBLICATIONS

3GPP, "3rd Generation Partnership Project; Technical Specification Group Core Network and Terminals; T8 reference point for Northbound APIs; (Release 16)", 3GPP TS 29.122 V16.2.0, (Jun. 2019), 1-309.

3GPP, "3rd Generation Partnership Project; Technical Specification Group Services and System Aspects; Procedures for the 5G System; Stage 2 (Release 15)", 3GPP TS 23.502 V15.2.0, Jun. 2018, 1-308.

Unknown, Author , "Inter Access System Handover between 3GPP and non 3GPP Access Systems Alternate Solutions for section 7.8.3.4", 3GPP TSG SA WG2 Architecture—S2#51, S2-060731, Denver, Colorado, USA, Feb. 13-17, 2006, 1-5.

* cited by examiner

| Enumeration value | Description | Applicability (NOTE 1) |
|---|---|---|
| LOSS_OF_CONNECTIVITY | The SCS/AS requests to be notified when the 3GPP network detects that the UE is no longer reachable for signaling or user plane communication | Loss_of_connectivity_notification |
| UE_REACHABILITY | The SCS/AS requests to be notified when the UE becomes reachable for sending either SMS or downlink data to the UE | Ue-reachability_notification |
| LOCATION_REPORTING | The SCS/AS requests to be notified of the current location or the last known location of the UE | Location_notification |
| CHANGE_OF_IMSI_IMEI_ASSOCIATION | The SCS/AS requests to be notified when the association of an ME (IMEI(SV)) that uses a specific subscription (IMSI) is changed | Change_of_IMSI_IMEI_association_notification |
| ROAMING_STATUS | The SCS/AS queries the UE's current roaming status and requests to get notified when the status changes | Roaming_status_notification |
| COMMUNICATION_FAILURE | The SCS/AS requests to be notified of communication failure events | Communication_failure_notification |
| AVAILABILITY_AFTER_DDN_FAILURE | The SCS/AS requests to be notified when the UE has become available after a DDN failure | Availability_after_DDN_failure_notification, Availability_after_DDN_failure_notification_enhancement |
| NUMBER_OF_UES_IN_AN_AREA | The SCS/AS requests to be notified the number of UEs in a given geographic area | Number_of_UEs_in_an_area_notification, Number_of_UEs_in_an_area_notification_5G |
| PDN_CONNECTIVITY_STATUS | The SCS/AS requests to be notified when the 3GPP network detects that the UE's PDN connection is set up or torn down. | Pdn_connectivity_status |
| DOWNLINK_DATA_DELIVERY_STATUS | The AF requests to be notified when the 3GPP network detects that the downlink data delivery status is changed. | Downlink_data_delivery_status_5G |
| NOTE 1: Properties marked with a feature as defined in subclause 5.3.4 are applicable as described in subclause 5.2.7. If no features are indicated, the related property applies for all the features.<br>NOTE 2: More monitoring types can be added in the future based on stage 2. | | |

*FIG. 1*

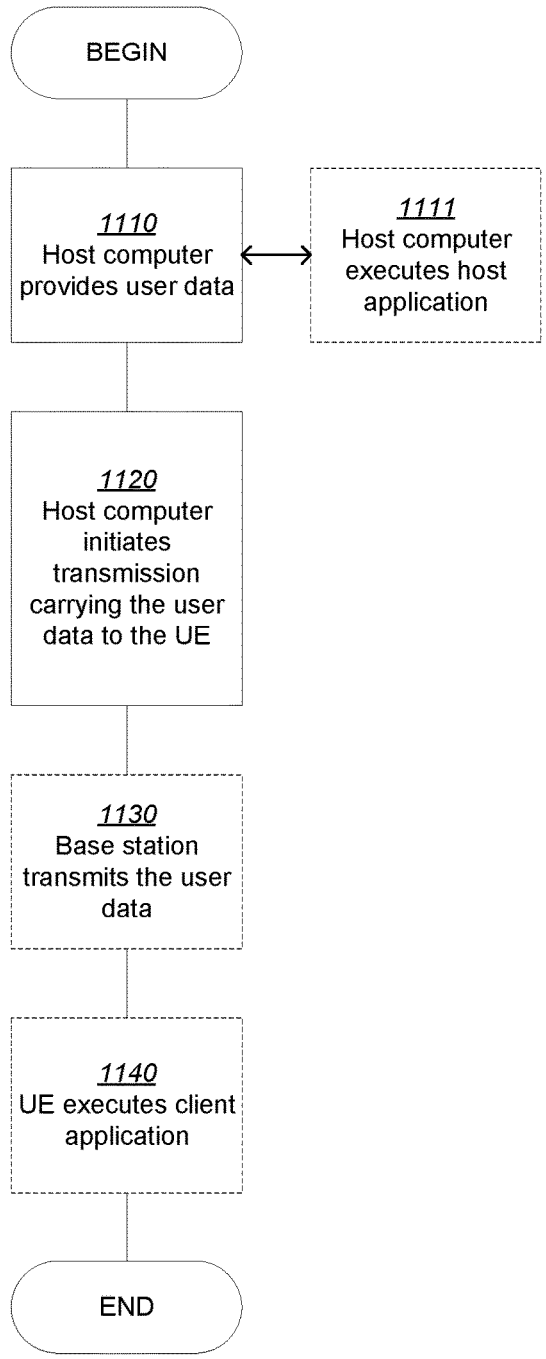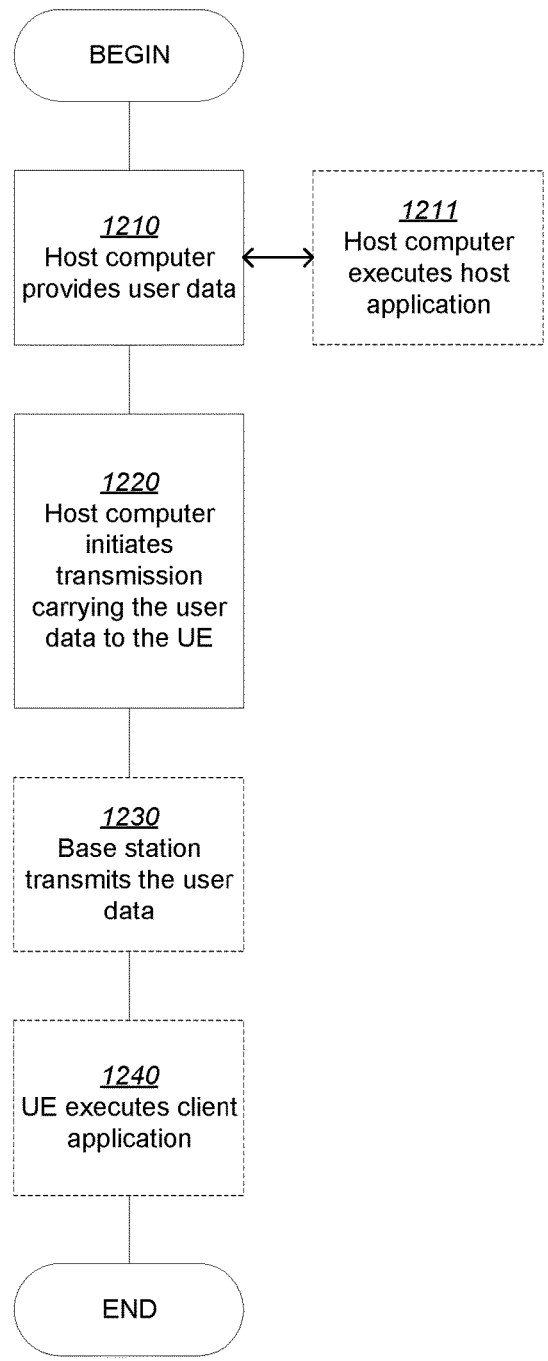
*FIG. 11*  *FIG. 12*

NOTIFICATION OF EXPECTED EVENT

TECHNICAL FIELD

The present disclosure generally relates to the field of wireless network communications, and more particularly, to improving application performance in a wireless communication system.

BACKGROUND

Applications that are used for vehicular application (V2X) or for the remote control of machines in a factory may require a guaranteed Quality of Service (QoS) with respect to bitrates, packet delays or packet error ratios. This is challenging for V2X applications, where the intrinsic mobility of vehicular user equipments (UEs) has at least two implications. First, while moving, UEs will experience channel condition changes and network events (e.g., handover, temporary loss of connectivity, etc.). Second, network load might vary over time and at different locations. Both of these implications might influence the experienced QoS for V2X UEs and, consequently, the way a V2X application might behave (e.g., how a remote control application controls the vehicle).

One approach addresses these issues by enhancing application awareness about network capabilities. Internet-of-Things (IoT) use cases are examples of this awareness, where it is important to be aware whether a certain UE can be reachable (e.g., for sensors that switch on and off) and where the UE is located (e.g., for moving sensors without GPS). 3GPP TS 29.122 V16.2.0 introduced the possibility of applications subscribing to monitoring of certain events. The list of events defined by 3GPP can be found in the table in FIG. 1, where the table shows monitoring types. Different events to which the application can subscribe are also described. The monitoring events subscription allows the application to specify, for instance, a Maximum Number of Reports or Monitoring Duration.

Other approaches to extending application awareness about network capabilities include the exchange of additional and tunable information between a service and a network, to extend the network knowledge about the service and to allow the service to have visibility of some network capabilities. For instance, the network information might indicate whether the QoS requested by the service might be supported by the network, where this information might come from real-time or statistical data analysis or from a network availability and service quality prediction in a given geographical area and time window. Such information might be used by the service to optimize the delivery of the service, such as by adapting the behavior of the service according to network capabilities such as, for example, supported QoS in a certain geographical area.

SUMMARY

Embodiments described herein are directed to improving predictability of application performance in a wireless communication system by predicting an upcoming network event affecting one or more UEs operating in the system and notifying an application server (AS) providing an application service to the UE of the predicted network event. Some network events (e.g., handover) that are relevant to particular applications (e.g., V2X) can be estimated/predicted and made known to relevant applications in order to increase their awareness about expected network behavior. This could be one of the tasks in estimating expected network performance. Ad hoc algorithms designed to estimate/predict specific network events can also be expected to provide more accurate information to be used to understand the impact the event has on other network functionalities and also on application behavior.

The application service side can benefit from information describing predicted or expected network events. This will support enhanced application adaptation and help the application service to avoid misbehavior. For instance, during handover, a user plane interruption might be detected by an application remotely controlling a vehicle. If the application is not aware that this represents an "expected behavior" of an "expected event" and that the interruption is expected to last a short time interval, the application could react by thinking that the vehicle lost its connectivity and consequently the vehicle may react by switching to a safe mode operation (e.g., severe speed reduction, moving towards emergency lane, switch to human driver). This could be avoided with the embodiments described herein, as the application would receive the information about the expected event and be made aware that the vehicle is not going to permanently lose its connectivity. The availability of such information describing an expected network event can help with the tasks such as key performance indicator (KPI) performance estimation and prediction to improve their accuracy.

Of course, the present invention is not limited to the above features and advantages. Those of ordinary skill in the art will recognize additional features and advantages upon reading the following detailed description, and upon viewing the accompanying drawings.

In a first aspect, there is provided a method for improving predictability of application performance in a wireless communication system, the method comprising the steps of predicting an upcoming network event affecting at least a first user equipment operating in the wireless communication system, and notifying an application server provided an application service to the first user equipment of the predicted network event.

It is noted that the above also entails that a key performance indicator, KPI, of the first user equipment may be affected and thus also that the step of notifying comprises notifying the application server of the key performance indicator, KPI, predicted considering information describing a predicted network event.

In an example, the predicting is performed by one or more nodes in a mobile network domain, and wherein the notifying the application server is performed by forwarding information describing the predicted network event to an application function, AF, node, the AF node notifying the application server of the predicted network event, or to a network data analytics function, NWDAF, which uses information describing the predicted network event to predict a key performance indicator, KPI, which is provided to an application function, AF, node, the AF node notifying the application server of the predicted key performance indicator, KPI.

BRIEF DESCRIPTION OF THE FIGURES

FIG. 1 shows a table of enumeration monitoring types.

FIGS. 11 to 14 are flowcharts illustrating example methods implemented in a communication system including a host computer, a base station and a user equipment.

DETAILED DESCRIPTION

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE or NR, but can be adapted in other radio access technologies where the techniques or selections may be relevant.

With regard to fulfillment of QoS, in 3GPP TS 23.502v15.2.0, 3GPP introduced the "Notification control" procedure where the 5G radio access network (RAN) indicates to the 5G core (5GC) that the Guaranteed Flow Bit Rate (GFBR) for an active QoS flow of a packet data unit (PDU) Session can no longer be fulfilled, thus enabling the possibility for the 5GC to react (e.g., by triggering a modification or a removal of the QoS flow) to a change of QoS capabilities and/or to inform the Application Function (AF) as soon as communicated by the 5G-RAN. Some proactive approaches to triggering notifications have been introduced, but such approaches involved monitoring events that were designed to consider only the needs of IoT applications (i.e., when a UE is reachable and where a UE is located). Thus, the list of monitoring events is limited, while other events might be of interest for other applications such as V2X applications. Furthermore, the notification of monitored events happens as a reaction to the realization of a certain event, i.e., the event happens and then it is notified to the application. This approach might limit the capability of the application to adapt its behavior to react to a certain network event (especially considering an V2X application where a certain application adaptation might involve mechanical reactions at the vehicle side, such as reducing speed that takes a few seconds).

Some notification approaches allow an application to be aware of achievable network performance in a certain area, to be notified in advance if a certain QoS change is expected and to be aware about which QoS/performance is expected after the change. Nevertheless, there is one aspect to consider. When estimating/predicting parameters such as expected QoS (minimum achievable bitrate, maximum latency, etc.), some network events (e.g., handover) might limit the accuracy associated with such estimation.

Figure 2:
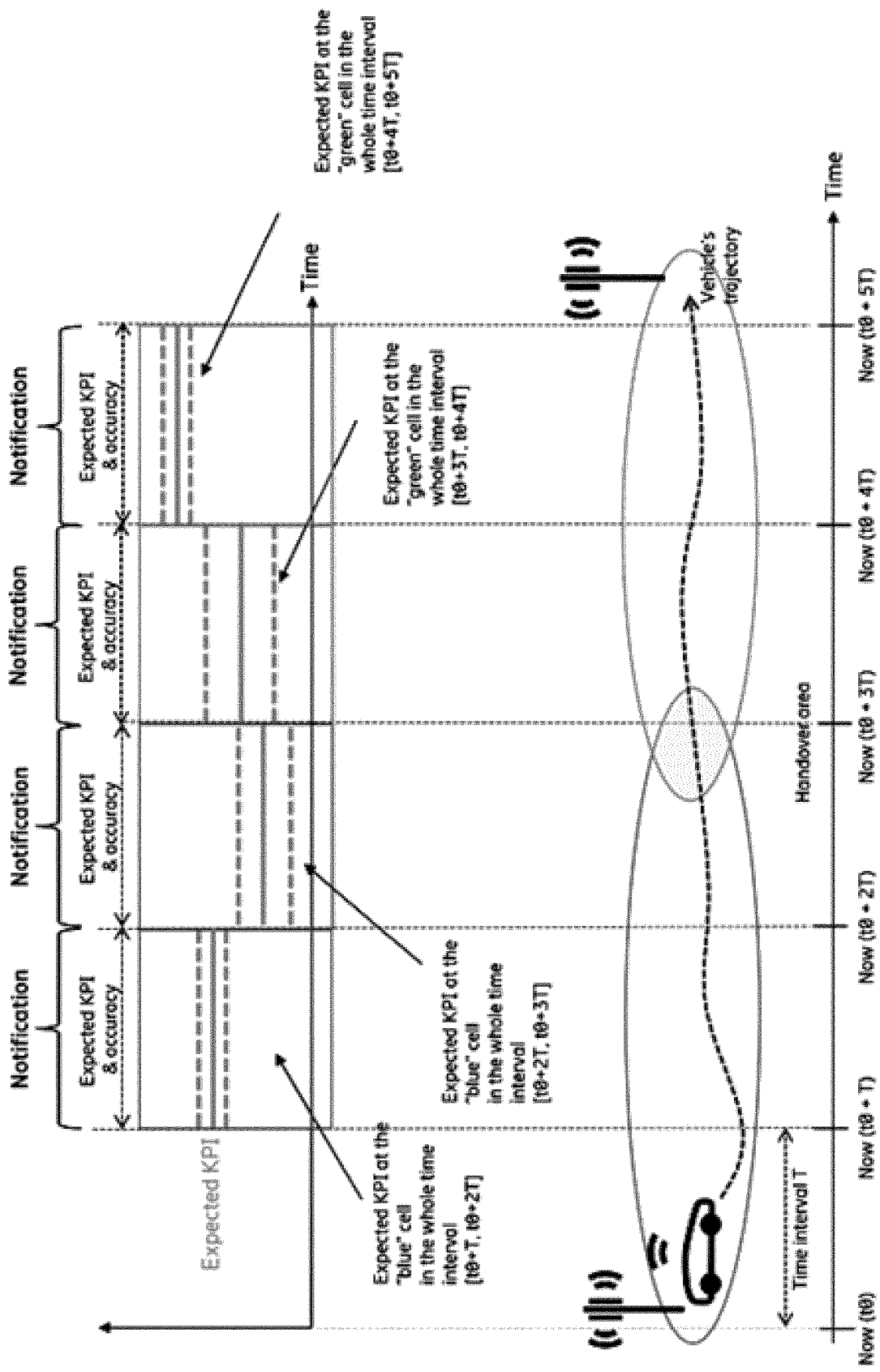
FIG. 2 illustrates an example of KPI estimation for a UE.

For instance, FIG. 2 shows the task of key performance indicator (KPI) estimation for a UE without considering the input of an event notifier. In this example, there is one network functionality in charge of estimating the expected evolution of the value of a certain KPI (e.g., achievable bitrate) over a certain time interval (the line in the plot on the top, marked as "Expected KPI"). Associated with the expected KPI is information about the accuracy of its estimation (represented by the dotted lines in the plots near the top of the figure, showing the possible range of the value of the expected KPI considering its estimation accuracy). In this example, for simplicity or implementation feasibility, this network functionality performs the KPI estimation considering a certain time interval of duration T. This network functionality estimates the expected variation of the value of the KPI over multiple consecutive windows, each of duration T. In this example, the UE of interest for this estimation task is a vehicle, which, while moving, will be connected before to a first (blue) cell and after to a second (green) cell (i.e., the UE will experience a handover along its trajectory).

In FIG. 2, it can be seen that the functionality in charge of the KPI estimation estimates the KPI of interest and the associated accuracy during the whole time interval of interest, generating a notification containing the expected KPI value for each time window T of the time interval under consideration. This functionality takes into consideration the fact that the UE will change the cell it is attached to by considering how the estimated KPI and the associated accuracy are expected to evolve in the process of moving from the first cell to the second cell. In particular, one can note that when the time of moving from the first cell to the second cell is approaching, the accuracy of the expected KPI may deteriorate (as denoted by the larger range of the expected KPI estimation when approaching the area of the handover), due to several reasons such as uncertainty on when precisely the handover will be triggered, uncertainty on the target cell the UE will be attached to after the handover, etc. In sum, some network events might impact the accuracy of estimation/prediction tasks, thus limiting the utility of estimated/predicted information at the application side (e.g., the accuracy is too low).

Embodiments described herein are directed to improving predictability of application performance in a wireless communication system. An example application may be a V2X application whose end-points are a remote Application Server (AS) and an application at vehicle side (also referred to as UE App). An example of an Application Function (AF) may be a control-plane network function, which is relevant to a certain application and which interacts with some functions of the mobile network such as a Network Exposure Function (NEF), a Policy Control Function (PCF) or a Network Data Analytics Function (NWDAF). The role of the AF is to interact with the mobile network in order to trigger the adequate procedure according to the needs of the associated application (e.g., negotiate specific QoS treatment or request specific network services). There is then an interface (usually application-specific) between the AF and the associated application (usually with the AS). The Mobile Network may provide connectivity that is used by the V2X application. The mobile network may comprise a radio access network (RAN), core network functions and an OAM (Operations, administration and management) system. The target functions of the mobile network of interest may be an NEF, an NWDAF, a Session Management Function (SMF) and a PCF. While this disclosure uses 5G terminology (e.g., AF, NEF, NWDAF, PCF), the embodiments can be applied to 4G networks too.

Embodiments described herein may extend the capabilities of a mobile network with a functionality for estimating whether a certain network event is expected to happen for a certain UE, and support the negotiation of event reporting from the application side and the associated notification from the network side. Examples of network events may include, for example, a handover, an inter-frequency handover, an inter-RAT handover, or a temporary radio link failure. From an application perspective, the network event may represent an event that could potentially impact the way the application behaves and might require an application reaction to adapt its behavior. Thus the application could benefit from being aware of the expected realization of such network event.

In one embodiment, a mobile network may determine whether a certain network event is expected to happen for a certain UE (or group of UEs) and provide the information including the description of the expected event to a network functionality (or functionalities) of interest. This functionality may be referred to as an event notifier. In one example where the target network event is a handover, the event notifier checks whether a handover event is expected to happen for a certain UE and provides information including the description of the handover event to the relevant network functionalities in case it is expected to happen.

The event notifier might consider several event features when executing the notification task, where such features might be either vendor/implementation-specific, or set according to operator's policies or configuration, or set upon request. An event may be of a certain event type that indicates which particular event is the object of the task (e.g., handover). The event type could be represented in different ways, e.g., according to a pre-defined code associated to a particular event or by using other semantics. Another event feature may include geographical constraints. For example, the functionality is enabled only when the UE is located in a certain geographical area. Another event feature may be time constraints. The functionality may be enabled only in specific time intervals or the functionality may be enabled for a certain time duration since it is requested. Event features may include UEs and applications of interest, such as the task considers one specific UE (or UEs) and potentially also a particular application (or applications) among those associated with the UE.

Event features may include UE-specific information/criteria. This may be, for example, information about past, current, expected UE locations (or any combination of these), in the form of geographical location or network location or both. This information may be a UE's expected trajectory in the form of a list of locations and associated timestamps, information about UE capabilities, etc. Predicting and/or notification of events may be conditioned on filtering with respect to any of these criteria, as well as any of the other event features described herein.

Event features may include notification-specific information, which represents information specific to how the functionality determines whether a certain event is relevant to be notified. Such information could be either application specific (i.e., relevant to the applications with which the target UE is associated), vendor-implementation specific or set according to a Mobile Network Operator's (MNO) policies. One example is information about specific KPIs (fulfillment of certain QoS parameters, availability of user plane connectivity, etc.) of interest for the UE to be monitored or for some particular applications with which the UE is associated. In this case, for instance, the functionality determines whether the expected event impacts one or more of the specific KPIs (e.g., the functionality checks whether the network event is expected to impact the capability of fulfilling a certain QoS parameter of interest of the application) for the UE of interest (or for one of the applications of the UE). Another example, possibly in combination with a previous example, is information about an event duration interval. For example, the functionality determines whether the event under consideration is expected to last more than a certain interval. Another example, possibly in combination with previous examples, is information about in-advance notification. For example, the functionality should be able to determine a certain time in advance whether a certain event is expected to happen (for example, the functionality determines that a handover is expected to happen in 20 seconds).

Event features may include network information and/or measurements. These may be, for example, specific network measurements (e.g., network load, network performance) from specific network functions or nodes or from an OAM system. These measurements may be in the form of historical, statistical, or predicted information (or any combination of these). Event features may also include third party information and/or measurements. This information may be, for example, information such as coverage maps, information about a weather forecast, information about traffic load or information about public events.

By considering the list of event features described above, it should be noted that the information that a certain network event is expected to happen could be either information based on historical network events (e.g., the network event already happened in the past for that UE at that specific location/time), based on statistical network events (e.g., other UEs with similar capabilities experienced the network event in that specific time/location), or based on a predicted network event (e.g., for the UE in that specific time/location, it is predicted that the network event will happen).

According to some embodiments, the event notifier (e.g., mobile network domain node) generates some event information, information which might be including a number of features. On such feature is the event type, indicating which particular event is expected (e.g., handover). The event type could be represented in different ways, such as according to a pre-defined code associated to a particular event or by using other semantics.

Another feature is a notification type, indicating which particular type of notification is associated to the expected event. Examples of notification type are: historical (e.g., indicating that the network event is expected as in the past the network event has already happened for that UE at that specific location/time); statistical (e.g., indicating that the network event is expected as it has already occurred in the past to other UEs with similar capabilities in that specific time/location, or it has occurred in the past in occasions with similar UE-specific information, notification-specific information, 3rd party information/measurements as in the case under consideration); or predicted (e.g., indicating that the network event is expected to happen in a certain location/time considering the current or expected network conditions/measurements, UE-specific information, notification-specific information, 3rd party information/measurements).

Another feature is event accuracy, indicating the accuracy associated with the expected event (i.e., how likely is the expected event going to happen). The accuracy can be represented in different ways, including statistical ways of measuring accuracy (e.g., the expected event happened in 80% of the cases in the past in the same time/location) or other approaches as for instance standard deviation, variance, confidence interval (e.g., 0.9, 0.95, 0.99) associated with the measurements associated to the network event under consideration. For estimation or prediction of network type, the accuracy might be represented by the estimated accuracy of estimation/prediction.

Another feature is an event duration, indicating the expected duration of the event, for instance in the form of start/end time (also including future times), or in the form of start time plus duration interval. For example, in the case where the network event type is handover, an event duration equal to 200 ms would indicate that the overall network event handover is expected to last 200 ms. Additional event duration information, such as minimum, maximum, or average duration might be included too in the event duration field.

Another feature is an event description, indicating additional information associated with the event. One example of an event description is the following. Assuming that a certain network event is associated with notification-specific information, such as unfulfillment of certain QoS parameters, the event description might include information about which of the QoS parameters included in the notification-specific information is expected to be unfulfilled due to the event. In another example where the notification-specific information associated with a certain network event is the availability of user plane connectivity, the event description might include information that the network event is expected to impact the availability of user plane connectivity. This may include information such as a time interval in which the user plane connectivity is expected to not be available. For instance, for a handover event with an event duration of 200 ms, the event description might include the information that within this window of 200 ms, the user plane is expected to not be available for a time interval of 50 ms. In another example where the notification-specific information associated with a certain network event is the unfulfillment of certain QoS parameters and availability of user plane connectivity, the event description might include information that the expected network event is expected to impact the availability of user plane connectivity but not the fulfillment of QoS parameters. In another example, the event description might indicate whether the expected event impacts a certain UE (or UEs) or a certain application (or applications). The event description might be generated while considering pre-defined description information associated with a certain network event or considering historical or statistical or predicted expectations associated with the event.

The event notifier introduced in the embodiments described herein can be implemented in several locations within the operator domain, including existing network functions (some of them might be NWDAF, SMF, AMF, PCF), or as a functionality part of the OAM system or as a functionality of a 3rd party application or as any combination of the above. There might also be the case where an event notifier associated with some events is implemented in some locations (e.g., as a functionality of existing network functions) or other event notifiers associated other events are implemented in other locations (e.g., as a functionality of the OAM system). The event information produced by the event notifier may be provided to other existing network functions (e.g., PCF, NEF, or to AF either directly or via PCF or NEF), or to the OAM system.

In another embodiment, a mobile network implements a functionality where an event notifier interacts with another network functionality (or other functionalities) by providing the expected event information to allow the target network functionality to take this information into consideration when executing its own task (i.e., the task execution of the network functionality is modified by the reception of the information from the event notifier). In one example, the network functionality that receives and utilizes the information generated by the event notifier is in charge of estimating the expected UE performance or behavior, for instance, in the form of a target KPI (e.g., achievable bitrate). In this embodiment, the network functionality has a certain behavior that is modified when an event information from the event notifier is received. The network functionality that interacts with the event notifier can be implemented in several locations within the operator domain, including existing network functions (some of them might be NWDAF, SMF, AMF, PCF), or as a functionality part of the OAM system or as a functionality of a third party application. In addition, the network functionality can interact directly or indirectly with the event notifier by means of existing or new network interfaces, either standardized or proprietary.

Figure 3:
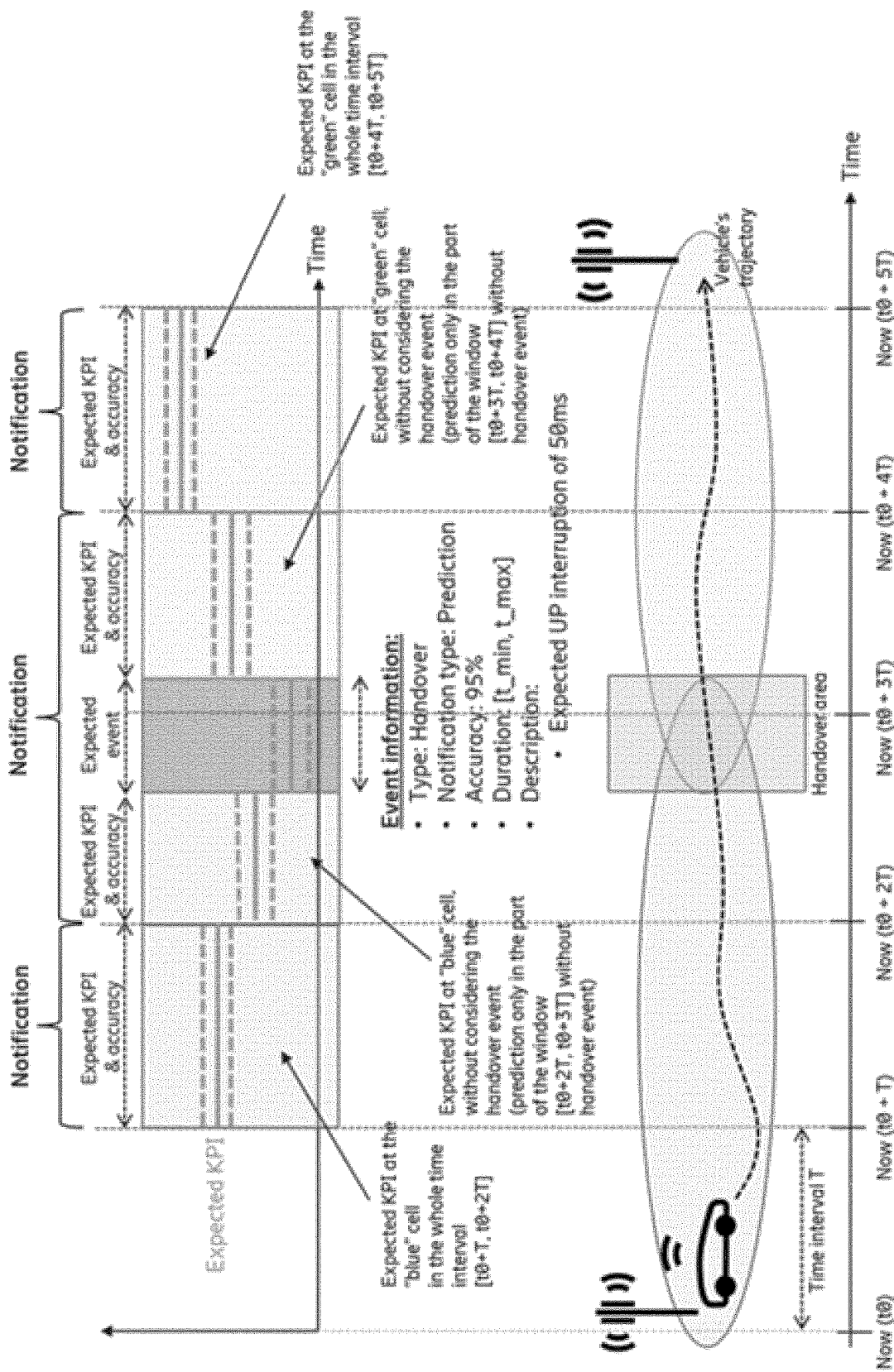
FIG. 3 illustrates an example of KPI estimation for a UE considering the input of a predicted network, according to some embodiments.

FIG. 3 shows a representation of this embodiment, to be compared with the example above in FIG. 2. In FIG. 3, the approach shown in FIG. 2 is modified according to some embodiments. In some embodiments, the event notifier provides the information of the expected event (in this example of a handover) to the network functionality in charge of the KPI estimation. Given the availability of detailed information on the expected event (e.g., in which window it is expected to happen), the KPI estimator takes this information into account to, for instance, modify the time intervals used for estimation during the handover event. From FIG. 3, the KPI estimation, when the handover event is expected to happen, is performed considering a shorter time window with respect to the normal time window T (i.e., the KPI is estimated without calculating its evolution during the handover event interval). As a consequence, the KPI estimation can now benefit from the availability of the handover event information—before and after the handover event, the KPI estimation is executed with good accuracy, while during the expected handover event the information provided by the event notifier provides the necessary description of what it is expected to happen during that time window.

In another embodiment, a mobile network implements a functionality allowing a network function (or a network functionality) to request the notification of an expected network event (or network events), also providing additional information to be used to configure the network event notification at the mobile network side and/or to be used as inputs for the network event notification task.

In an embodiment, the network function is an AF which, according to needs of the application it is associated to and according to the information obtained from such application, requests the mobile network to be notified about a particular network event and provides the mobile network with a set of information to be used for the network event notification. In one example, the AF can interact directly with target network functions (e.g., PCF, NWDAF, SMF, AMF, NEF, OAM system) or functionalities (e.g., event notifier), or the AF can interact indirectly with the target function/functionalities via the NEF.

Certain information may be included in the request of an AF. This information may include, as explained earlier, an event type, UEs of interest, applications of interest, geographical constraints, time constraints, UE-specific information, notification-specific information, and/or event accuracy.

In another embodiment, a mobile network is extended with a functionality able to receive from a network function (or functionality) a request of notification of an expected network event (or network events), and to process the received request using the information provided within the request in order to configure the task of network event notification and/or as inputs for the network event notification task. This functionality could also include a step of generating and sending a response to the network function (or functionality) that generated the request, the response indicating whether the request has been accepted and authorized. The response may include information about specific features included in the request that cannot be supported. In one example of this embodiment, this functionality is implemented in a network function of a mobile network (e.g., NEF, PCF, NWDAF) or in a network functionality (e.g., an event notifier) that receives a request of notification of an expected network event from an AF (either directly or via the NEF). The receiver of the request performs several actions while progressing the request. This may include a request authorization. For example, the network function or functionality receiving the request determines whether the request can be authorized, either directly or by contacting other network functions such as PCF. The authorization might be based on subscription or SLA information, and may consider the UEs to which the request refers.

The receiver of the request might contact the event notifier that is associated with the network event listed in the request and provide the information (or part of) included in the request. The event notifier might check whether the request can be supported and use the information to configure the event features for the notification task. For instance, as stated in an earlier embodiment, the event notifier might consider several event features when executing the notification task, which might be set as follows. The event types might be set according to the event types included in the request. The UEs and applications of interest might be set according to those indicated in the request. The geographical constraints, time constraints, UE-specific information and/or notification-specific information may also be set to those respective features that are indicated in the request. For instance, the request might indicate some specific KPIs to be monitored (e.g., fulfillment of certain QoS parameters, availability of user plane connectivity, event duration, etc.) and in this case, for instance, the notification from the event notifier should be driven by determining whether the expected event impacts one or more of the listed KPIs. In another example, if the request contains information about in-advance notification, then the event notifier should configure its task in order to be able to trigger a notification a certain time in-advance before the time the event is expected to happen. For example, the event notifier triggers the notification 20 seconds in advance before the target network event is expected to happen.

Network information/measurements or third party information/measurements may be set according to the event types included in the request. For example, different event types may require a different configuration of 3rd party information/measurements necessary to perform the task of estimating the expected network event. The event notifier might consider the event accuracy included in the request to verify whether the minimum or desired accuracy requested can be supported or not.

Note that in the case where some of the event features necessary for the event notifier to perform its task are not included in the request, or in the case where the event notifier cannot support a setting of a specific feature as indicated in the request, the event notifier might use predefined settings according to, for example, vendor/implementation settings or operator-specific policies/configuration.

A response may be provided for the request. For example, a response is provided indicating whether the request has been granted or not, also indicating whether the notification will be executed considering a different configuration with respect to the information included in the request.

In another embodiment, a mobile network is extended with a functionality able to process the information event generated by an event notifier and expose (make known) the information about an expected network event to another network function (or functionality). The event information might be either exposed directly as generated by the event notifier or upon a processing step of translation of internal-external information which might be performed according, for example, vendor/implementation settings or operator-specific policies/configuration. For instance, some information may be excluded from the notification (e.g., not relevant, or operator policies avoid some information to be exposed, or some specific subscribers are not allowed to receive some particular information) or some information might be modified (e.g., specific values translated into ranges). Note that the event information generated by the event notifier might be generated a certain time in-advance before the event it is expected to happen, if such a setting was included in the notification-specific information associated with the network event.

In one example, the information about an expected network event that is generated by a certain event notifier might be exposed to network functions such as PCF, NWDAF, NEF, AF (directly of via NEF) or to a functionality of the OAM system. The exposed event information, generated considering the event information from the event notifier, might include an event type, a notification type (e.g., historical, or statistical or predicted), event accuracy, an event duration, or an event description. Please note that such notification from the event notifier may happen in several ways, and this might depend on information included for instance in a request of an AF, or from operator or vendor configuration. The notification may be sent as soon as the event notifier detects the upcoming event, or a certain time in-advance before the event is expected to happen. Several notifications associated with the same event may be sent to further notify, after the first notification, whether the expected event (or its associated description and/or accuracy) is still valid, and/or to notify some changes to the expected event (or its associated description and/or accuracy).

In another embodiment, a network function or functionality interacting with a mobile network is extended with a functionality able to receive information about an expected network event and to process and provide such information to relevant applications of relevant UEs.

In one implementation, this embodiment might target an AF which receives the exposed information of an expected event by a mobile network, and process such information to provide the necessary information to the application to which the AF is associated. For instance, according to the information included in the event description field, the AF might check whether the expected event refers to particular UEs or applications, and provides the adequate information (e.g., event type, notification type, event accuracy, event duration, event description) to the relevant applications of the relevant UEs, either directly as received from the mobile network or after a processing step (e.g., for data format translation). The information about the expected event may be used by the application to enhance its knowledge about expected network behavior and, if necessary, to take adequate steps (reactions) to better accommodate the realization of the expected event. For instance, if a handover event is expected in a certain time window and the event description indicates that there might be an unavailability of user plane for 50 ms, for instance, the application can take into consideration such information then avoid interpreting the temporary loss of user plane availability when the handover will happen as a permanent loss of connectivity. In another example, if a handover event is expected in a certain time window and the event description indicates that the event is expected to cause the unfulfillment of a certain QoS parameter (e.g., minimum bitrate), then the application might react by changing its configuration (e.g., inter-packet generation interval) to generate a lower bitrate. This may potentially be reflected in the behavior of the vehicle associated with the application (e.g., the vehicle has to reduce its speed).

The adequate reactions (e.g., changes of configuration) might also be provided from the application side interacting with the AF (e.g., the application server) to the other side of the communication (e.g., application at the vehicle side).

Figure 4:
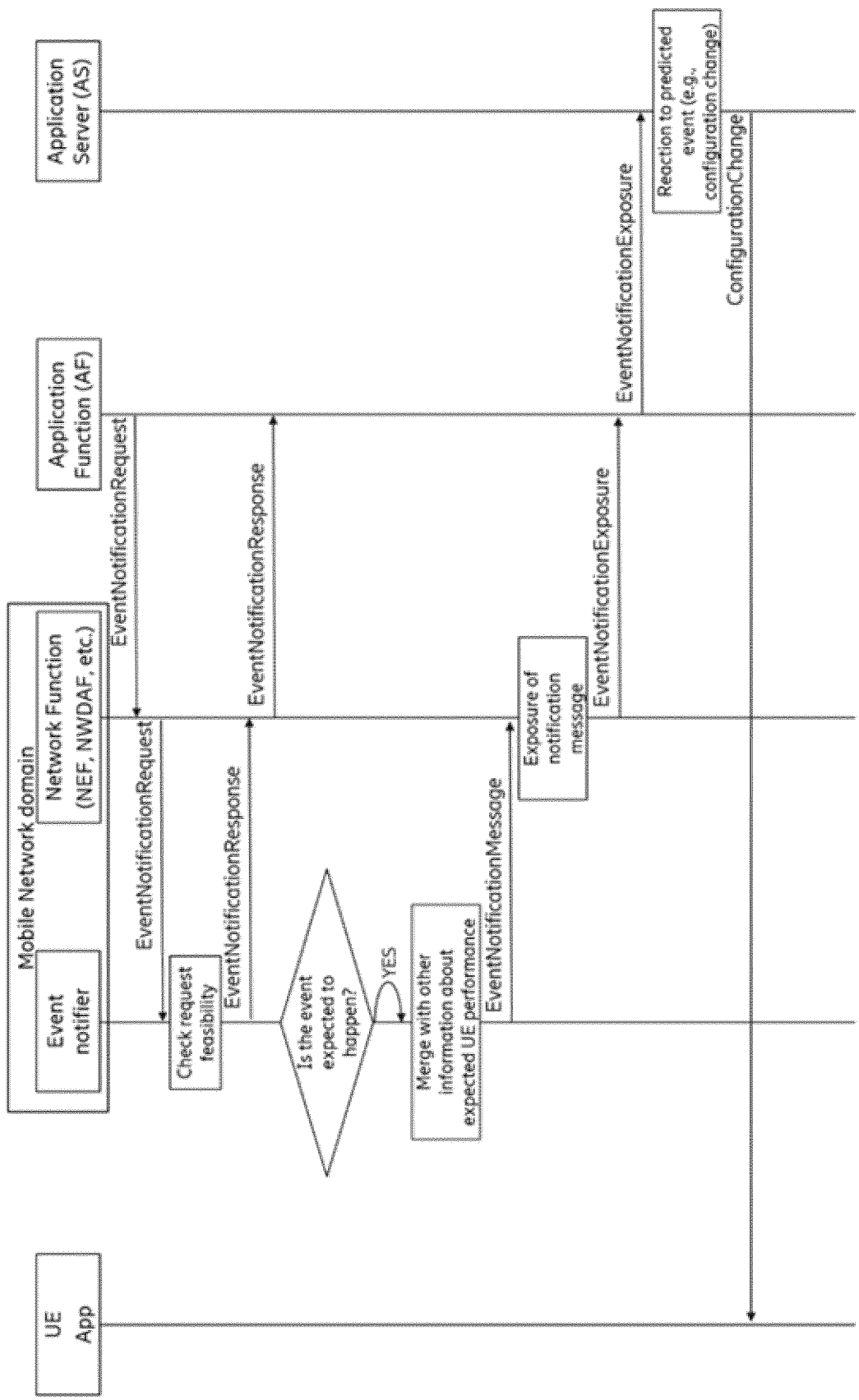
FIG. 4 illustrates a signaling diagram of for information about predicted network events, according to some embodiments.

FIG. 4 is an example signaling diagram of different embodiments described herein. An AF sends a request of notification of an expected network event to a mobile network (e.g., NEF, PCF, NWDAF). The request is set according to the needs of the applications to which the AF is associated. The AF adds the following event feature information in the request: event type, UE (or UEs) of interest, application (or applications) of interest, geographical constraints, time constraints, UE-specific information, notification-specific information, and/or event accuracy.

At the reception of the request from the AF, the mobile network processes the request. As a first step, the mobile network checks whether the request can be authorized (e.g., by checking with the PCF whether the AF and the associated UEs are authorized to get notification of expected network events). The mobile network interacts with the event notifier in order to check whether the request can be supported, e.g., whether the event notifier supports the event features included in the request. The event notifier uses the event feature information included in the request in order to set the features of the network event task.

The mobile network, upon feedback from the event notifier of whether the request can be supported, provides a response to the AF. The event notifier performs its notification task considering the event features that are associated with the specific request. In this example, the event notifier estimates that the target network event is expected to happen. The event notifier generates the event information associated to the expected event, including any event feature information. Other network functions/functionalities might use the output from the event notifier to merge the event information with other information about other estimation tasks (as for instance depicted in FIG. 3).

The event information is exposed by the event notifier to other network functions of the mobile network, e.g., a NEF, which performs information translation and exposes the event information to the relevant AF. The AF receives the event information from the mobile network, translates and provides such information to the relevant applications of the relevant UE(s) addressed in the request.

The application, according to event information, adapts its behavior (e.g., configuration change) and informs the other side of the communication (i.e., the application at the vehicle side) about the triggered configuration change.

The embodiments described herein introduce a network functionality able to estimate whether a certain network event is expected to happen for particular UEs and/or applications. In some embodiments, this functionality provides a description of the expected network event, which contains information about the time interval when the network event is expected to happen and how the event will impact the relevant UE/application. Such information might be generated in advance of when the event is expected to occur. In one embodiment, one application can interact with the network to request some particular network event notification and a certain particular setting for notification generation, and also to provide inputs to be used for the network event notification task. The information about the expected network event may be used by other functionalities within the network to complement their estimation/prediction tasks and help the application to make adequate decisions, if necessary, to adapt its behavior according to the expected event.

Figure 5:
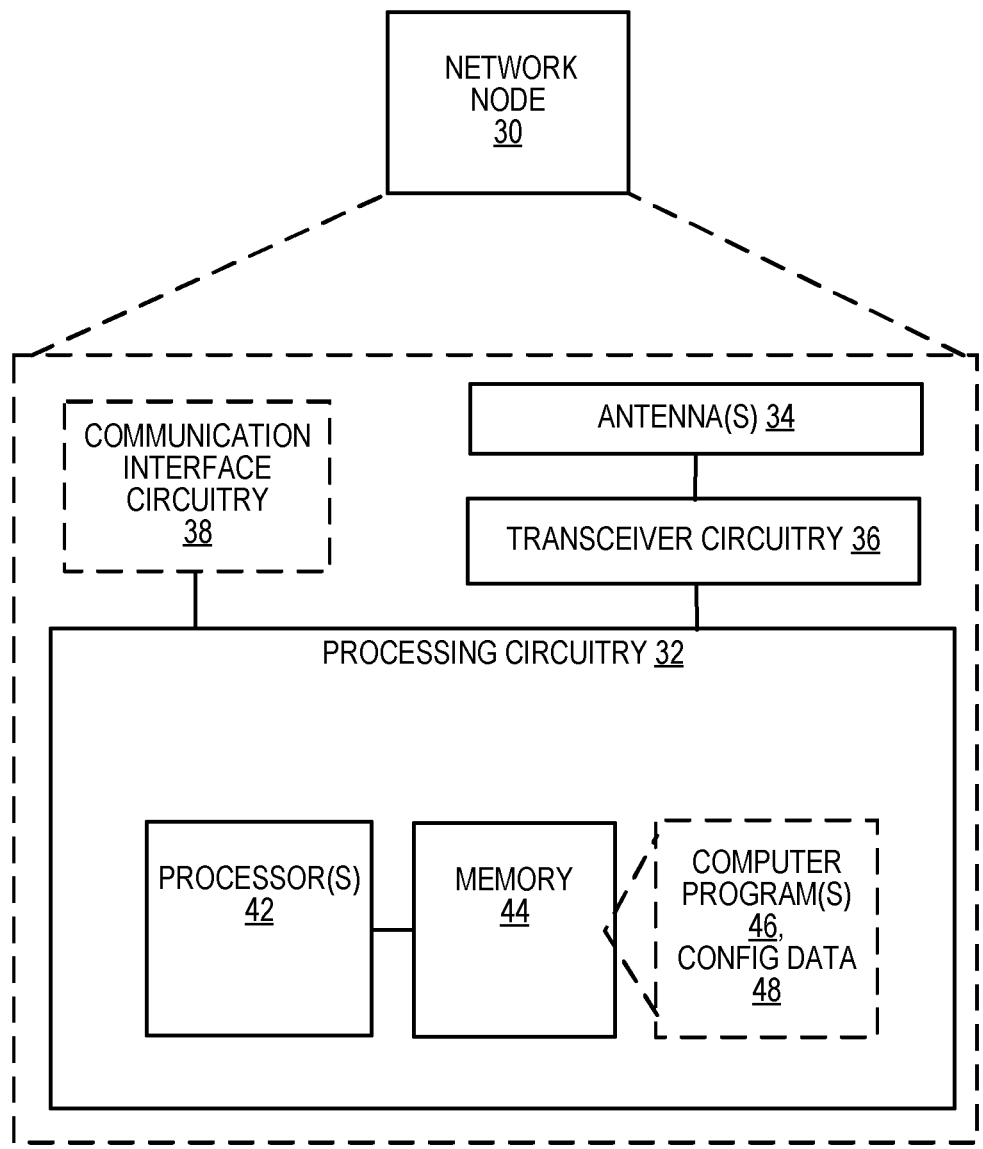
FIG. 5 illustrates is a block diagram of a network node, according to some embodiments.

The multiple embodiments described above may be carried out by one or more network nodes configured to perform the actions of different network elements. One network element may include a mobile network domain in communication with an Application Function (AF). Another network element may be an Application Server (AS). FIG. 5 shows such an example network node 30. The network node 30 may be a configured to operate as a cellular network access node in a 5G New Radio (NR) network, but the embodiments are not limited to NR or just cellular technologies.

Those skilled in the art will readily appreciate how each type of node may be adapted to carry out one or more of the methods and signaling processes described herein, e.g., through the modification of and/or addition of appropriate program instructions for execution by processing circuitry 32.

Network node 30 facilitates communication between wireless terminals, other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with transceiver circuitry 36 and, in some cases, communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or may comprise some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by network access node 30. Processing circuitry 32 may be configured, e.g., through the use of appropriate program code stored in memory 44, to carry out one or more of the methods and/or signaling processes detailed hereinafter.

According to some embodiments, processing circuitry 32 of network node 30 is configured to operate as one or more nodes in a mobile network domain that improves the predictability of application performance in a wireless communication system. Processing circuitry 32 is configured to predict an upcoming network event affecting at least a first UE operating in the wireless communication system and notify an AS providing an application service to the first UE of the predicted network event.

Figure 6:
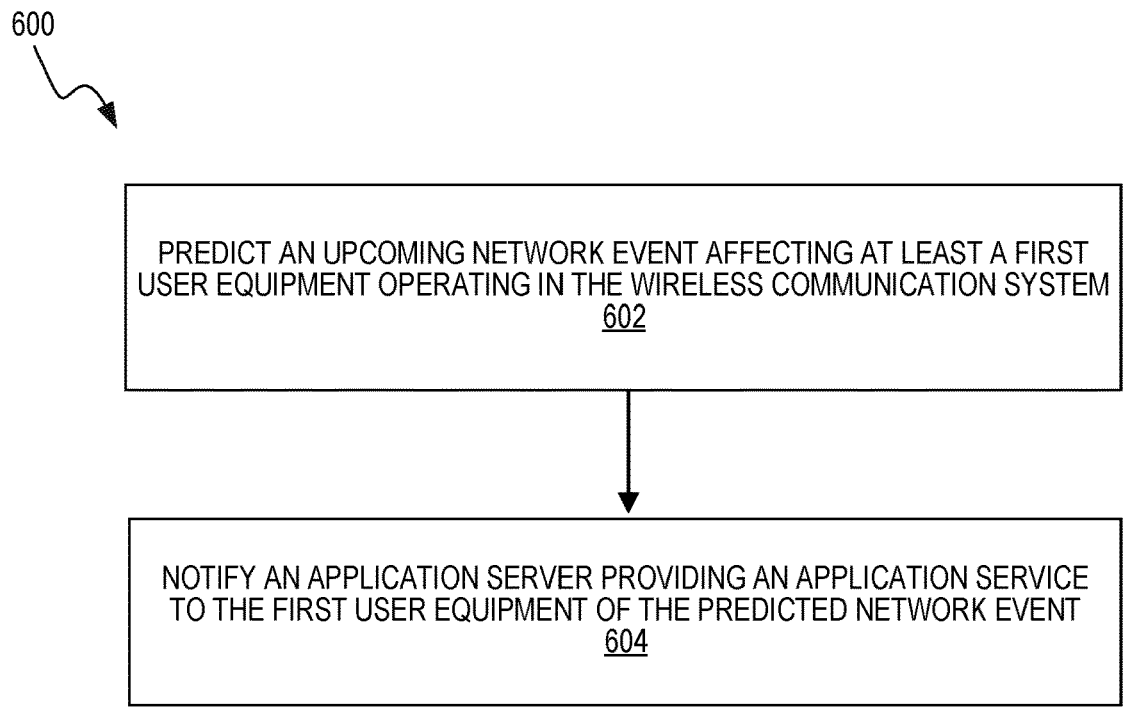
FIG. 6 illustrates a flowchart for a method in a network node acting as a mobile network domain, according to some embodiments.

Processing circuitry 32 may be configured to perform a corresponding method 600, such as shown by the flowchart in FIG. 6. Method 600 includes predicting an upcoming network event affecting at least a first UE operating in the wireless communication system (block 602) and notifying an AS providing an application service to the first UE of the predicted network event (block 604). The predicting may be performed by one or more nodes in a mobile network domain, and the notifying of the AS server may be performed by forwarding information describing the predicted network event to an AF node, where the AF node notifies the AS of the predicted network event. Notifying the application server of the predicted network event may include indicating a likelihood of the predicted network event. The notifying may also include indicating an expected timing and/or an expected duration of the predicted network event. The predicted network event may include a predicted handover of the first UE or a predicted temporary loss of connectivity for the first UE.

Method 600 may include receiving from an AF, at one or more nodes in a mobile network domain, a request for notification of one or more predicted network events, where at least the notifying is responsive to the request. The predicting and/or notifying may be conditioned on filtering dependent on any one or more of any of the following criteria or parameters included in the request for notification: event type; user equipment of interest; application of interest; geographical constraints for event; time constraints for event; key performance indicator, KPI, affected by event; and notification timing.

According to some embodiments, processing circuitry 32 of network node 30 is configured to operate as the AF. As such, processing circuitry 32 is configured to receive a prediction of an upcoming network event affecting at least a first UE operating in the wireless communication system and notify an AS providing an application service to the first UE of the predicted network event.

Figure 7:
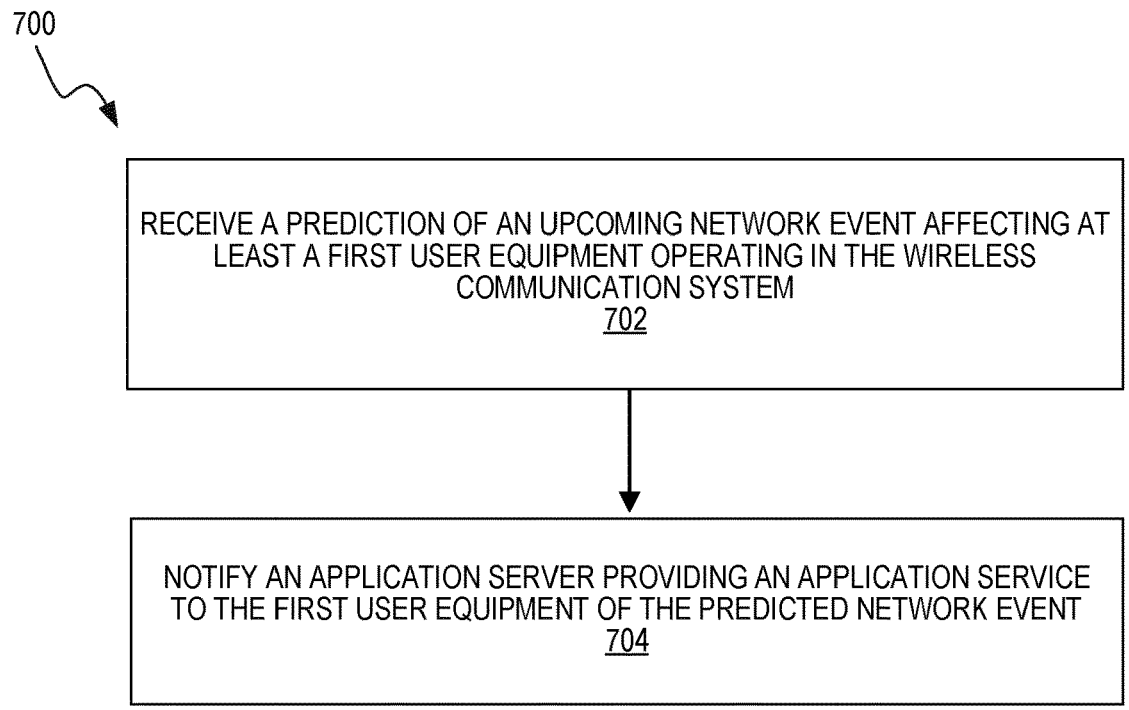
FIG. 7 illustrates a flowchart for a method in a network node acting as an AF, according to some embodiments.

Processing circuitry 32 may be configured to perform a corresponding method 700, such as shown by the flowchart in FIG. 7. Method 700 includes receiving a prediction of an upcoming network event affecting at least a first UE operating in the wireless communication system (block 702) and notifying an AS providing an application service to the first UE of the predicted network event (block 704). The first node may be an AF node.

Notifying the AS of the predicted network event may include indicating a likelihood of the predicted network event. The notifying may also include indicating an expected timing and/or an expected duration of the predicted network event. The predicted network event may include a predicted handover of first user equipment or a predicted temporary loss of connectivity for the first user equipment.

Method 700 may include sending, to a second node, a request for notification of one or more predicted network events, where receiving the prediction is responsive to the request. The request may include any one or more of the following criteria or parameters, for use in filtering which events are reported to the first node: event type; user equipment of interest; application of interest; geographical constraints for event; time constraints for event; key performance indicator, KPI, affected by event; and notification timing.

According to some embodiments, processing circuitry 32 of network node 30 is configured to operate as the AS providing an application service to at least the first UE operating in a wireless communication network. Processing circuitry 32 is configured to receive a notification of a predicted upcoming network event affecting at least the first user equipment and adjust operation of the AS and/or a configuration of the first UE, in response to the notification.

Figure 8:
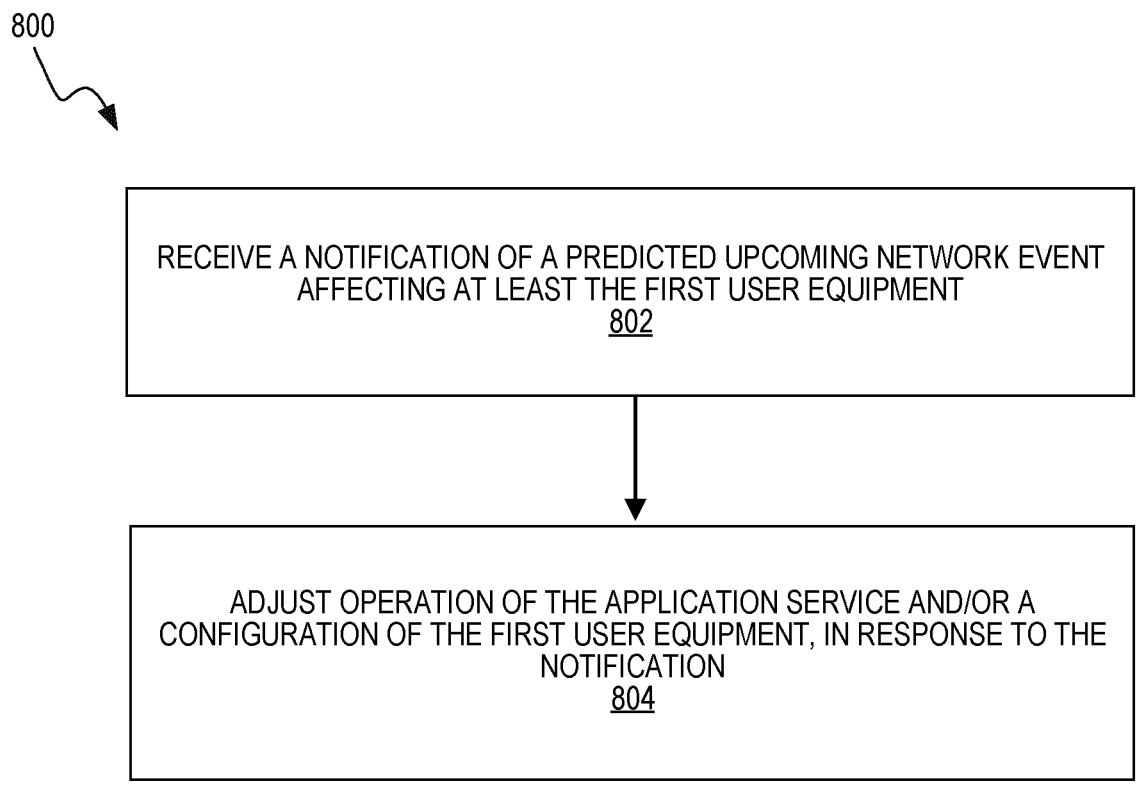
FIG. 8 illustrates a flowchart for a method in a network node acting as an AS, according to some embodiments.

Processing circuitry 32 may be configured to perform a corresponding method 800, such as shown by the flowchart in FIG. 8. Method 800 includes receiving a notification of a predicted upcoming network event affecting at least the first UE (block 802) and adjusting operation of the application service and/or a configuration of the first UE, in response to the notification (block 804). The notification may be received from an AF node. The notification may indicate a likelihood of the predicted network event, where the adjusting is based on the indicated likelihood. The notification may also indicate an expected timing and/or an expected duration of the predicted network event, where the adjusting is based on the expected timing and/or expected duration.

Figure 9:
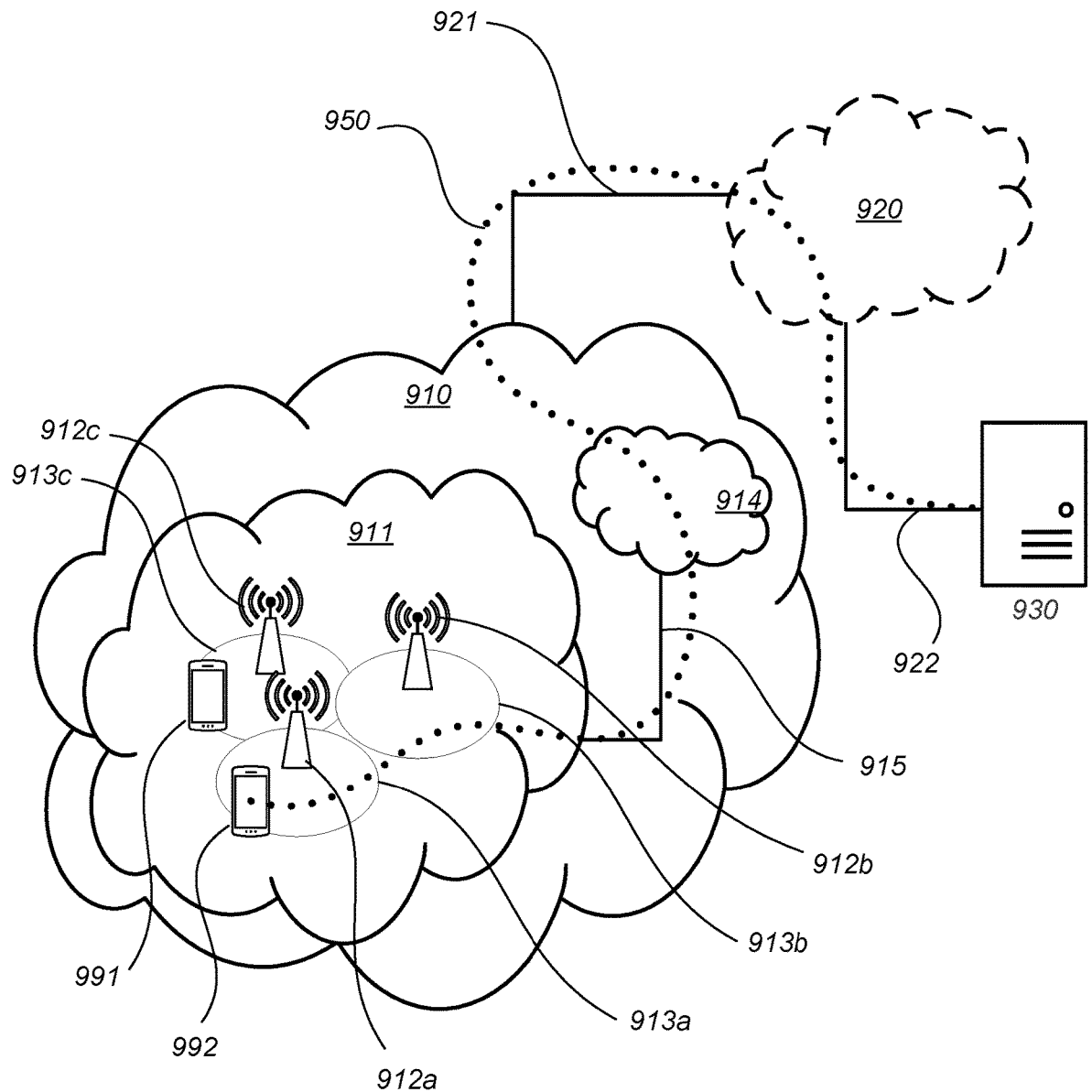
FIG. 9 schematically illustrates a telecommunication network connected via an intermediate network to a host computer, according to some embodiments.

FIG. 9, according to some embodiments, illustrates a communication system that includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
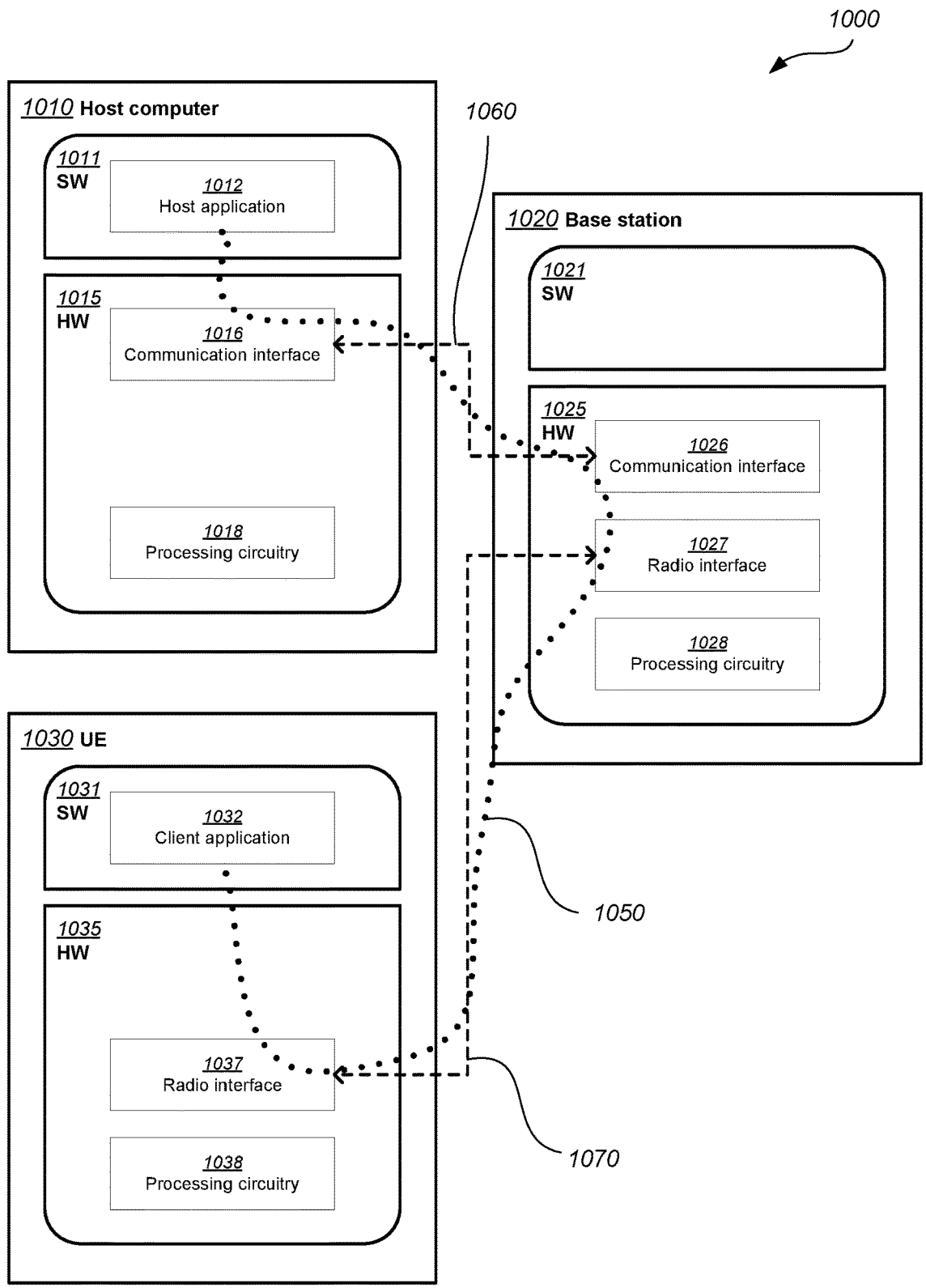
FIG. 10 is a generalized block diagram of a host computer communicating via a base station with a user equipment over a partially wireless connection, according to some embodiments.

It is noted that the host computer 1010, base station 1020 and UE 1030 illustrated in FIG. 10 may be identical to the host computer 1030, one of the base stations 1012a, 1012b, 1012c and one of the UEs 1091, 1092 of FIG. 10, respectively. This is to say, the inner workings of these entities may be as shown in FIG. 10 and independently, the surrounding network topology may be that of FIG. 12.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure, such as provided by nodes such as a wireless device and relay node 30, along with the corresponding method 800. The embodiments described herein can support enhanced application adaptation and help application services to avoid misbehavior. The teachings of these embodiments may improve the reliability, connections, data rate, capacity, latency and/or power consumption for the network and UE 1030 using the OTT connection 1050.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figures 13, 14:
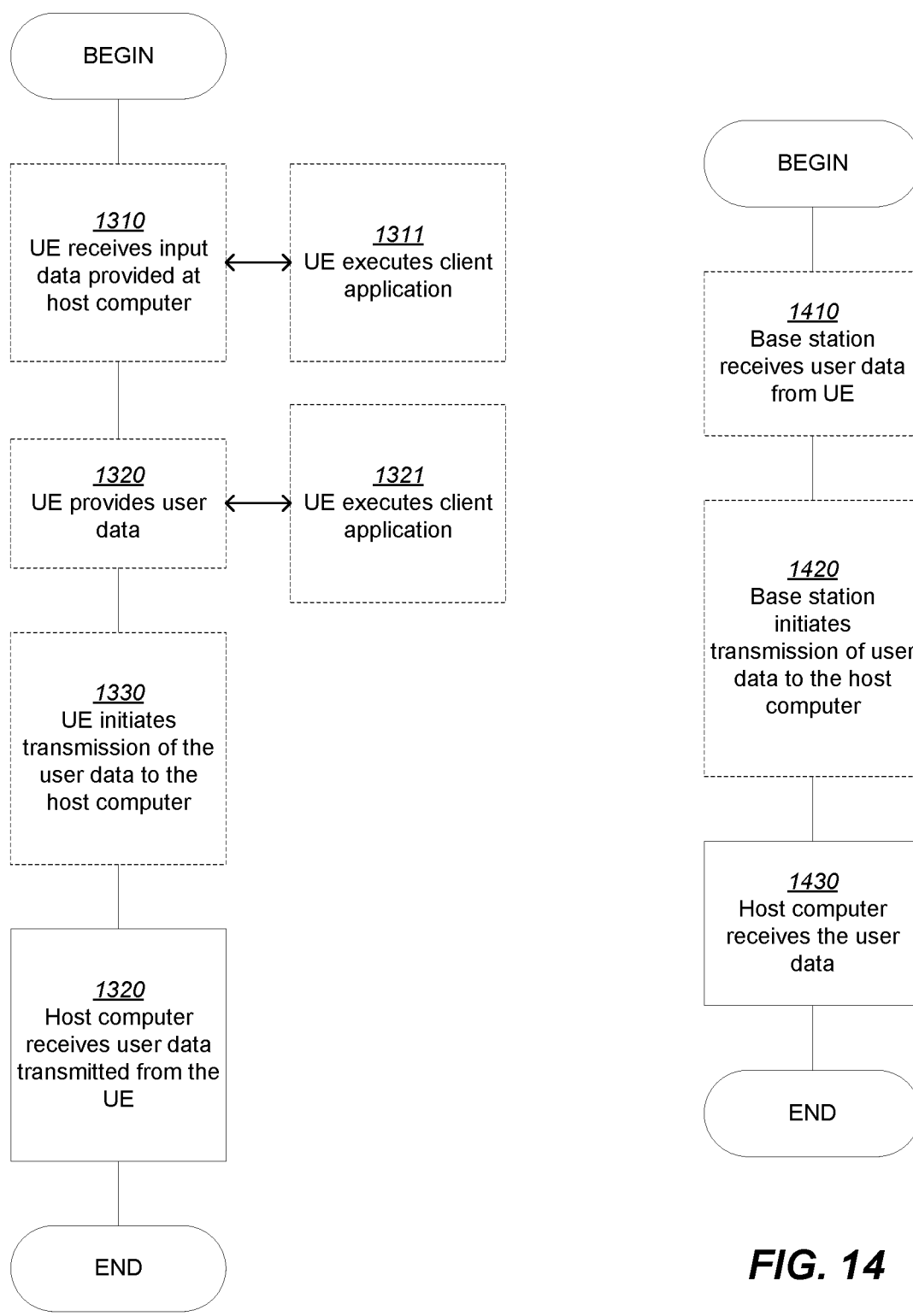

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally, or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

As discussed in detail above, the techniques described herein, e.g., as illustrated in the process flow diagram of FIGS. 6-8, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 15:
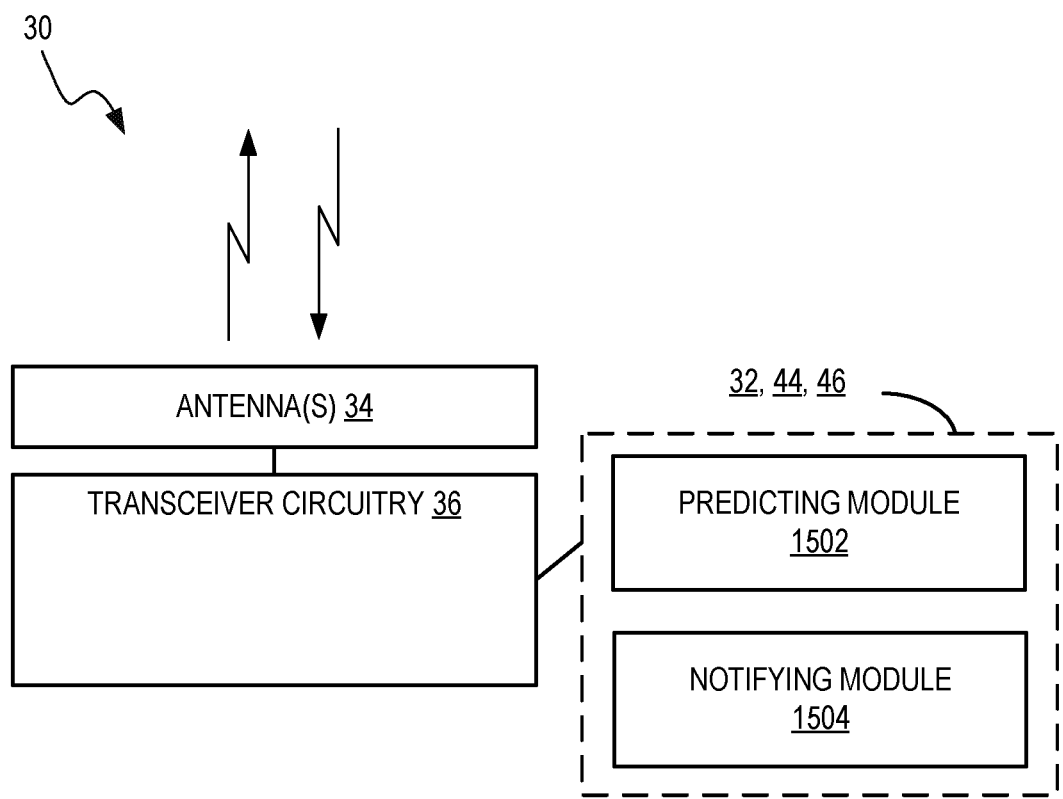
FIG. 15 is a block diagram illustrating a functional implementation of a network node acting as a mobile network domain, according to some embodiments.

FIG. 15 illustrates an example functional module or circuit architecture of a mobile network domain for improving predictability of application performance in a wireless communication system from a wireless communication device. The functional implementation includes a predicting module 1502 for predicting an upcoming network event affecting at least a first user equipment operating in the wireless communication system and a notifying module 1504 for notifying an application server providing an application service to the first user equipment of the predicted network event.

Figure 16:
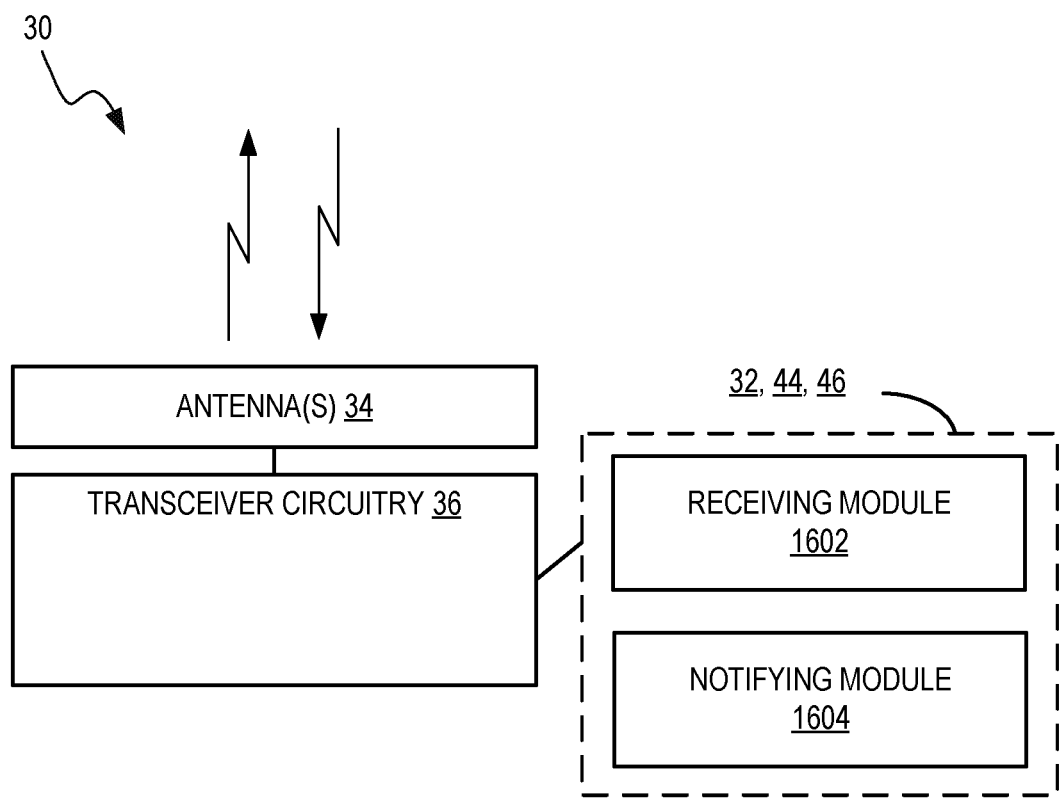
FIG. 16 is a block diagram illustrating a functional implementation of a network node acting as an AF, according to some embodiments.

FIG. 16 illustrates an example functional module or circuit architecture of an application function node for improving predictability of application performance in a wireless communication system from a wireless communication device. The functional implementation includes a receiving module 1602 for receiving a prediction of an upcoming network event affecting at least a first user equipment operating in the wireless communication system and a notifying module 1504 for notifying an application server providing an application service to the first user equipment of the predicted network event.

Figure 17:
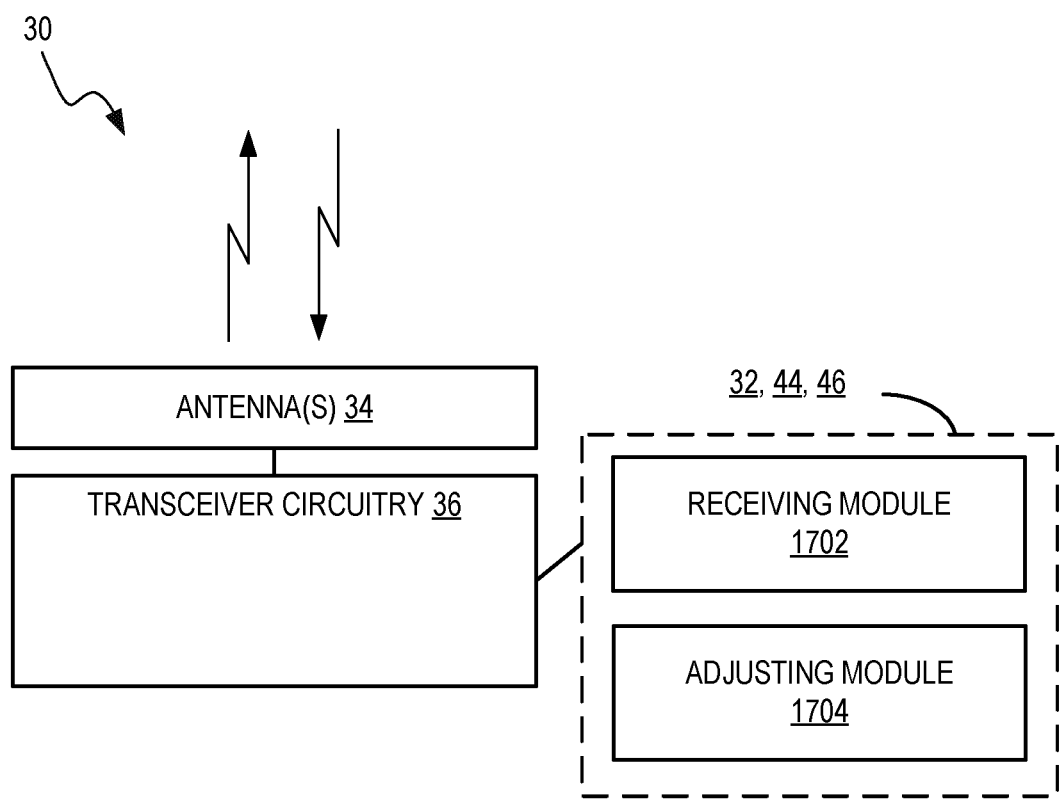
FIG. 17 is a block diagram illustrating a functional implementation of a network node acting as an AS, according to some embodiments.

FIG. 17 illustrates an example functional module or circuit architecture of an application server for improving predictability of application performance in a wireless communication system from a wireless communication device. The functional implementation includes a receiving module 1702 for receiving a notification of a predicted upcoming network event affecting at least the first user equipment and an adjusting module 1704 for adjusting operation of the application service and/or a configuration of the first user equipment, in response to the notification.

EXAMPLE EMBODIMENTS

A1. A communication system including a host computer comprising: processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-18.

A2. The communication system of the previous embodiment further including the base station.

A3. The communication system of the previous two embodiments, further including the UE, wherein the UE is configured to communicate with the base station.

A4. The communication system of the previous three embodiments, wherein:
the processing circuitry of the host computer is configured to execute a host application, thereby providing the user data; and
the UE comprises processing circuitry configured to execute a client application associated with the host application.

A5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of embodiments 1-18.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 1-18.

A9. The communication system of the previous embodiment further including the base station.

A10. The communication system of the previous two embodiments, further including the UE, wherein the UE is configured to communicate with the base station.

A11. The communication system of the previous three embodiments, wherein: the processing circuitry of the host computer is configured to execute a host application; and
the UE is further configured to execute a client application associated with the host application, thereby providing the user data to be received by the host computer.

A12. A method implemented in a communication system including a host computer, a base station and a user equipment (UE), the method comprising:
at the host computer, receiving, from the base station, user data originating from a transmission which the base station has received from the UE, wherein the base station performs any of the steps of any of embodiments 1-18.

A13. The method of the previous embodiment, further comprising at the base station, receiving the user data from the UE.

A14. The method of the previous 2 embodiments, further comprising at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method for improving predictability of application performance in a wireless communication system, the method comprising:

predicting an upcoming network event affecting at least a first user equipment operating in the wireless communication system, and notifying an application server providing an application service to the first user equipment of the predicted network event, wherein said step of predicting is performed by one or more nodes in a mobile network domain, and wherein said step of notifying the application server is performed by forwarding information describing the network event to an application function (AF) node, the AF node notifying the application server of the predicted network event, wherein said predicted upcoming network event is a handover, and wherein said information describing said handover is any of an event duration, an expected timing and an accuracy of said prediction.

2. The method of claim 1, wherein said notifying the application server of the predicted network event comprises indicating a likelihood of the predicted network event.

3. The method of claim 1, further comprising:
receiving, from an application function (AF) at one or more nodes in a mobile network domain, a request for notification of one or more predicted network events, wherein at least said step of notifying is responsive to said request.

4. The method of claim 3, wherein said predicting and/or said notifying are conditioned on filtering dependent on any one or more of any of the following criteria or parameters included in said request for notification:
event type;
User Equipment of interest;
application of interest;
geographical constraints for event;
time constraints for event;
key performance indicator (KPI) affected by event;
user-equipment-specific criterion; and
notification timing.

5. The method of claim 1, wherein the method is performed by an application function (AF) node.

6. The method of claim 1, further comprising sending, to a second node, a request for notification of one or more predicted network events, wherein said receiving said prediction is responsive to said request.

7. The method of claim 6, wherein said request comprises any one or more of the following criteria or parameters, for use in filtering which events are reported to the first node:
event type;
user equipment of interest;
application of interest;
geographical constraints for event;
time constraints for event;
key performance indicator (KPI) affected by event;
user-equipment-specific criterion; and
notification timing.

8. The method of claim 1, wherein the predicted network event comprises a predicted handover of first user equipment or a predicted temporary loss of connectivity for the first user equipment.

9. A network node comprising transceiver circuitry and processing circuitry operatively coupled to the transceiver circuitry and configured to perform the method of claim 1.

10. The network node of claim 9, wherein the network node is a mobile network domain node.

11. The network node of claim 9, wherein the network node is an application function (AF) node.

12. A non-transitory computer-readable medium comprising, stored thereupon, computer program instructions configured for execution by at least one processing circuit and configured to cause the at least one processing circuit to carry out the method of claim 1.

13. A method for improving application performance in a wireless communication system, the method comprising, in an application server providing an application service to at least a first user equipment operating in a wireless communication network:
receiving a notification of a predicted upcoming network event affecting at least the first user equipment by receiving information describing the network event; and
adjusting operation of the application service and/or a configuration of the first user equipment, in response to the notification.

14. The method of claim 13, wherein said predicted upcoming network event is a handover, and wherein said information describing said handover is any of an event duration, an expected timing and an accuracy of said prediction.

15. The method of claim 13, wherein the notification is received from an application function (AF) node.

16. The method of claim 13, wherein the notification indicates a likelihood of the predicted network event, wherein said adjusting is based on the indicated likelihood.

17. The method of claim 13, wherein the notification indicates an expected timing and/or an expected duration of the predicted network event, wherein said adjusting is based on the expected timing and/or expected duration.

18. A network node comprising transceiver circuitry and processing circuitry operatively coupled to the transceiver circuitry and configured to perform the method of claim 13.

19. The network node of claim 18, wherein the network node is an application server.

* * * * *

UNITED STATES PATENT AND TRADEMARK OFFICE
CERTIFICATE OF CORRECTION

| | | |
|---|---|---|
| PATENT NO. | : 12,156,084 B2 | Page 1 of 1 |
| APPLICATION NO. | : 17/629888 | |
| DATED | : November 26, 2024 | |
| INVENTOR(S) | : Condoluci et al. | |

It is certified that error appears in the above-identified patent and that said Letters Patent is hereby corrected as shown below:

On the Title Page

On Page 2, in Item (56), under "OTHER PUBLICATIONS", in Column 1, Line 8, delete "Author ," and insert -- Author, --, therefor.

In the Specification

In Column 1, Line 29, delete "aware" and insert -- aware of --, therefor.

In Column 3, Line 1, delete "of for" and insert -- for --, therefor.

In Column 3, Line 4, delete "is a" and insert -- a --, therefor.

In Column 6, Line 58, delete "On" and insert -- One --, therefor.

In Column 9, Lines 39-40, delete "while progressing the request. This may include a request authorization." and insert -- while processing the request. This may include authorization of the request. --, therefor.

In Column 10, Line 37, delete "according," and insert -- accordingly, --, therefor.

In Column 17, Line 7, delete "use" and insert -- user --, therefor.

Signed and Sealed this
Twenty-second Day of April, 2025

Coke Morgan Stewart
*Acting Director of the United States Patent and Trademark Office*